(12) United States Patent
Ku

(10) Patent No.: US 10,774,953 B1
(45) Date of Patent: Sep. 15, 2020

(54) CABLE TIE

(71) Applicant: Fei-Lung Ku, Tainan (TW)

(72) Inventor: Fei-Lung Ku, Tainan (TW)

( * ) Notice: Subject to any disclaimer, the term of this patent is extended or adjusted under 35 U.S.C. 154(b) by 0 days.

(21) Appl. No.: 16/542,517

(22) Filed: Aug. 16, 2019

(51) Int. Cl.
*B65D 63/10* (2006.01)
*F16L 3/233* (2006.01)

(52) U.S. Cl.
CPC ........ *F16L 3/2334* (2013.01); *B65D 63/1072* (2013.01); *B65D 2563/107* (2013.01); *B65D 2563/108* (2013.01); *Y10T 24/141* (2015.01); *Y10T 24/1498* (2015.01)

(58) Field of Classification Search
CPC . Y10T 24/1498; Y10T 24/141; Y10T 24/153; Y10T 24/1406; Y10T 24/2183; Y10T 24/1418; Y10T 24/142; Y10T 24/1422; B65D 63/1036; B65D 63/1063; B65D 63/1027; B65D 63/1045; B65D 63/1054; B65D 63/1072; B65D 63/1081; B65D 2563/107; F16L 3/233; F16L 3/2334; F16L 3/2336; F16L 3/2338
See application file for complete search history.

(56) References Cited

U.S. PATENT DOCUMENTS

| | | | | |
|---|---|---|---|---|
| 3,991,444 A | * | 11/1976 | Bailey | B65D 63/1063 24/16 PB |
| 4,958,414 A | * | 9/1990 | Benoit | B65D 63/1063 24/16 PB |
| 6,185,791 B1 | | 2/2001 | Khokhar | |
| 8,516,660 B2 | | 8/2013 | Ku | |
| 8,739,387 B1 | | 6/2014 | Frishberg | |
| 9,643,763 B2 | | 5/2017 | Kierstead | |
| 2010/0115738 A1 | * | 5/2010 | Kuhne | B65D 63/1063 24/271 |
| 2011/0271492 A1 | * | 11/2011 | Posner | F16L 33/035 24/16 R |
| 2013/0081232 A1 | * | 4/2013 | Magno, Jr. | B29C 45/16 24/16 PB |

FOREIGN PATENT DOCUMENTS

| | | |
|---|---|---|
| CN | 201914570 U | 8/2011 |
| CN | 205602397 U | 9/2016 |
| TW | I461332 B | 11/2014 |
| TW | I515149 B | 1/2016 |

\* cited by examiner

*Primary Examiner* — Robert Sandy
*Assistant Examiner* — Michael S Lee
(74) *Attorney, Agent, or Firm* — Rosenberg, Klein & Lee

(57) ABSTRACT

The present invention discloses a cable tie which comprises a locking head, a belt connected to the locking head by one end thereof and a buckle. The locking head comprises a channel for an insertion of the belt and an assembly groove adjacent to the channel. The buckle is pivotally connected to the assembly groove and has an engaging sheet to engage with plural rack teeth of the belt. The engaging sheet of the buckle further has a positioning protrusion extended from an upper end of the engaging sheet for correspondingly attaching to and moving along a first inclined surface at an upper region of a positioning block of the locking head by a bottom edge thereof for engaging with or unfastening a fastening surface of the positioning block.

5 Claims, 8 Drawing Sheets

CABLE TIE

BACKGROUND OF THE INVENTION

1. Field of the Invention

The present invention relates to a cable tie which is convenient for assembling a buckle to a locking head to increase conveniences of engaging teeth of a belt for engaging with or unfastening from the buckle.

2. Description of Related Art

Nowadays, reusable cable ties are developed. For instance, a bundle strap of the Taiwan Pat. No. I461332(B) issued on 21 Nov. 2014, a reversible cable tie of the Taiwan Pat. No. 1515149(B) issued on 1 Jan. 2016, a reusable bundle band of the China Pat. No. CN205602397(U) issued on 28 Sep. 2016, a reusable band of the China Pat. No. CN201914570U issued on 3 Aug. 2011, a reusable cable tie of the U.S. Pat. No. 9,643,763(B2) issued on 9 May 2017, a reusable cable tie of the U.S. Pat. No. 8,739,387(B1) issued on 3 Jun. 2014, a releasable cable tie of the U.S. Pat. No. 6,185,791(B1) issued on 13 Feb. 2001, and a cable tie of the U.S. Pat. No. 8,516,660(B2) issued on 27 Aug. 2013 are all about reusable bundle straps which prevent a waste of resource.

However, the reusable bundle straps or cable ties mentioned above lack in convenience in use and need to be improved.

SUMMARY OF THE INVENTION

The present invention discloses a cable tie which is convenient for assembling a buckle to a locking head to increase conveniences of engaging teeth of a belt for engaging with or unfastening from the buckle.

The cable tie of the present invention comprises a locking head, a belt connected to the locking head by one end thereof and a buckle. The locking head comprises a channel for an insertion of the belt and an assembly groove adjacent to the channel. The buckle is pivotally connected to the assembly groove and provided with an engaging sheet to engage with plural rack teeth of the belt. The engaging sheet has a positioning protrusion extended from an upper end of the engaging sheet for correspondingly attaching to and moving along a first inclined surface of a positioning block at an upper region of the locking head by a bottom edge thereof for engaging with or unfastening from a fastening surface at a back side of the positioning block. Accordingly, the present invention increases conveniences for engagement or unfastening plural engaging teeth of the belt and the buckle.

DETAILED DESCRIPTION OF THE PREFERRED EMBODIMENT

Figure 1:
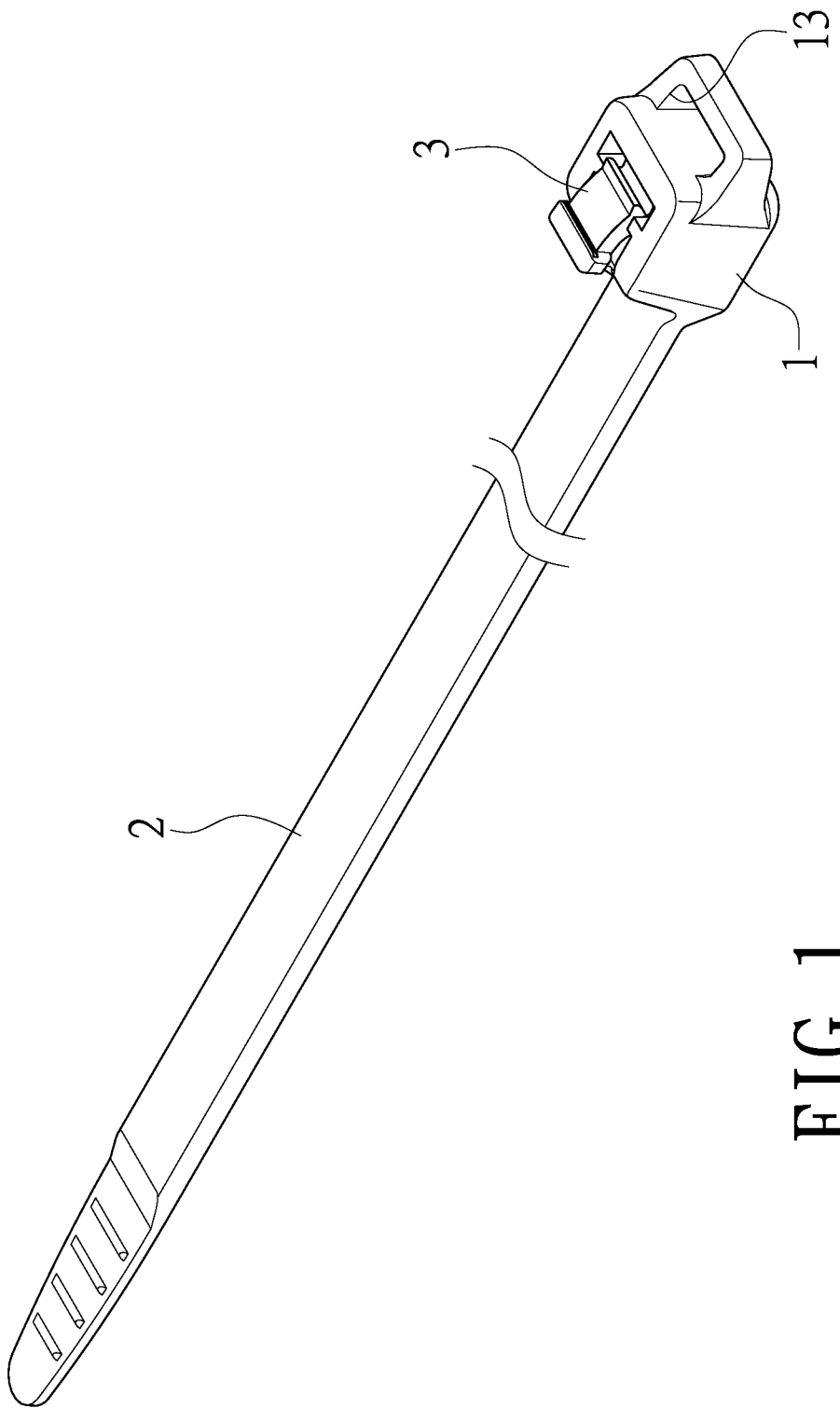
FIG. 1 is a first stereogram showing a cable tie of the present invention.
Figure 2:
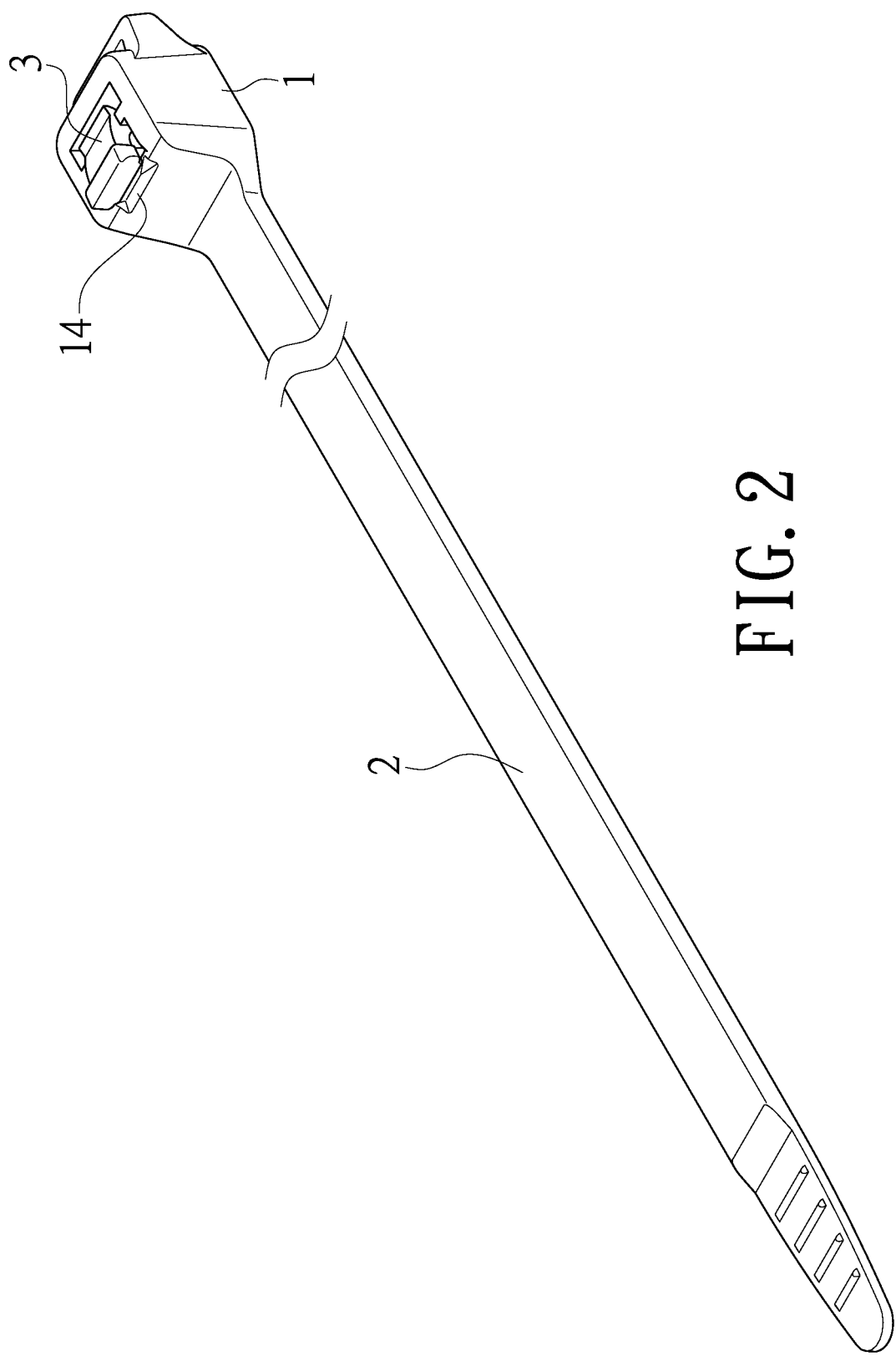
FIG. 2 is a second stereogram showing a cable tie of the present invention.
Figure 3:
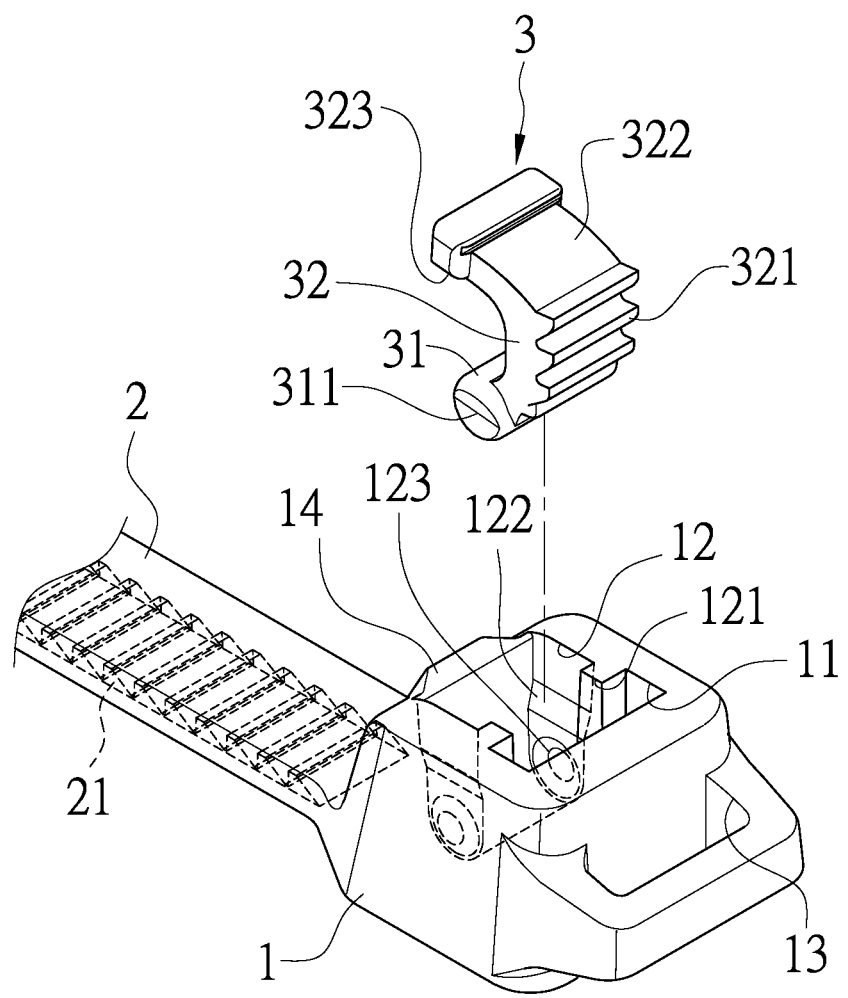
FIG. 3 is an exploded diagram showing a cable tie of the present invention.
Figure 4:
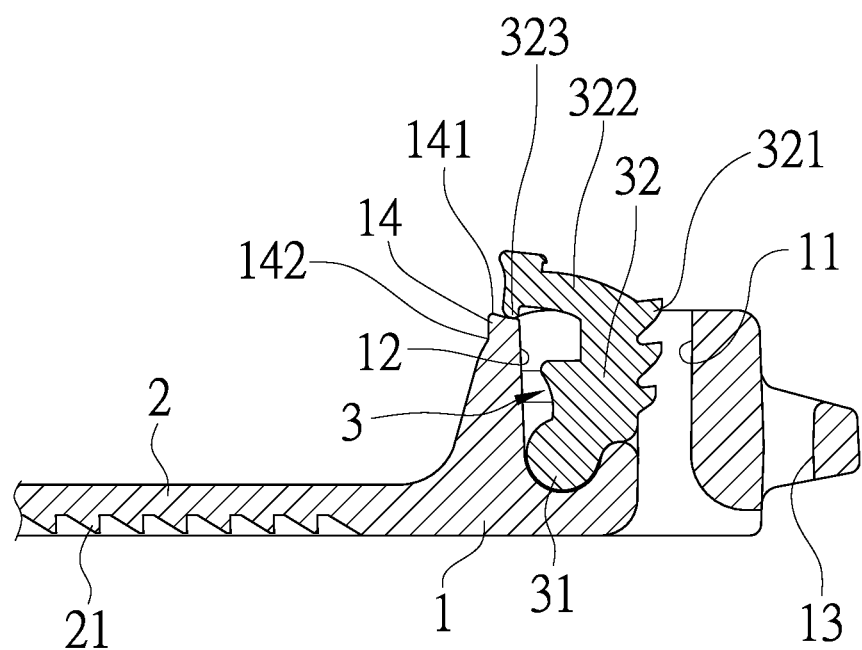
FIG. 4 is a sectional diagram showing a cable tie of the present invention.

Referring to FIG. 1 to FIG. 4, the cable tie of the present invention comprises a locking head (1), a belt (2) connected to a back side of the locking head (1) by one end and a buckle (3) disposed in the locking head (1).

The locking head (1) has a channel (11) and an assembly groove (12) adjacent to the channel (11). The assembly groove (12) has a hollow portion (121) communicated with the channel (11) at a front side, two guiding segments (122) tapered downward from an upper edge respectively at the two lateral walls thereof, and two pivot holes (123) respectively at two lateral walls close to a bottom thereof and each of the two pivot holes (123) is respectively located below each of the two guiding segments (122). The bottom of the assembly groove (12) has a curved surface. In addition, the locking head (1) is provided with a slot (13) at a front side and a positioning block (14) at an upper region of the back side thereof. The positioning block (14) has a first inclined surface (141) tiled downwardly to the assembly groove (12) at an upper edge thereof and a fastening surface (142) at a back side thereof.

One end of the belt (2) is connected to the back side of the locking head (1) by one end, and the other end of the belt (2) is a free end which inserts into the channel (11) of the locking head (1). The belt (2) is further provided with plural rack teeth (21) disposed longitudinally in a single direction on one surface thereof.

The buckle (3) is disposed in the assembly groove (12) of the locking head (1) and has a pivot (31) at a bottom thereof. The pivot (31) is provided with two second inclined surfaces (311) tapered downward at two ends of the pivot (31) so as to be placed in the locking head (1) by a guidance of the two guiding segments (122) of the assembly groove (12), contacted to the bottom having the curved surface of the assembly groove (12) and pivotally connect to the two pivot holes (123) respectively formed on two lateral walls of the assembly groove (12). The buckle (3) is further provided with an engaging sheet (32) connected to the pivot (31). The engaging sheet (32) has plural unidirectional engaging claws (321) at a front side thereof which pass through the hollow portion (121) of the assembly groove (12) and are located in the channel (11) for correspondingly engaging with the plural rack teeth (21) of the belt (2). The engaging sheet (32) further has an extension segment (322) bended back from an upper end of the engaging sheet (32) and a positioning protrusion (323) at a bottom of the extension segment (322). The positioning protrusion (323) attaches to and moves along the first inclined surface (141) of the positioning block (14) of the locking head (1) by a bottom thereof for engaging with or unfastening from the fastening surface (142) of the positioning block (14).

Figure 5:
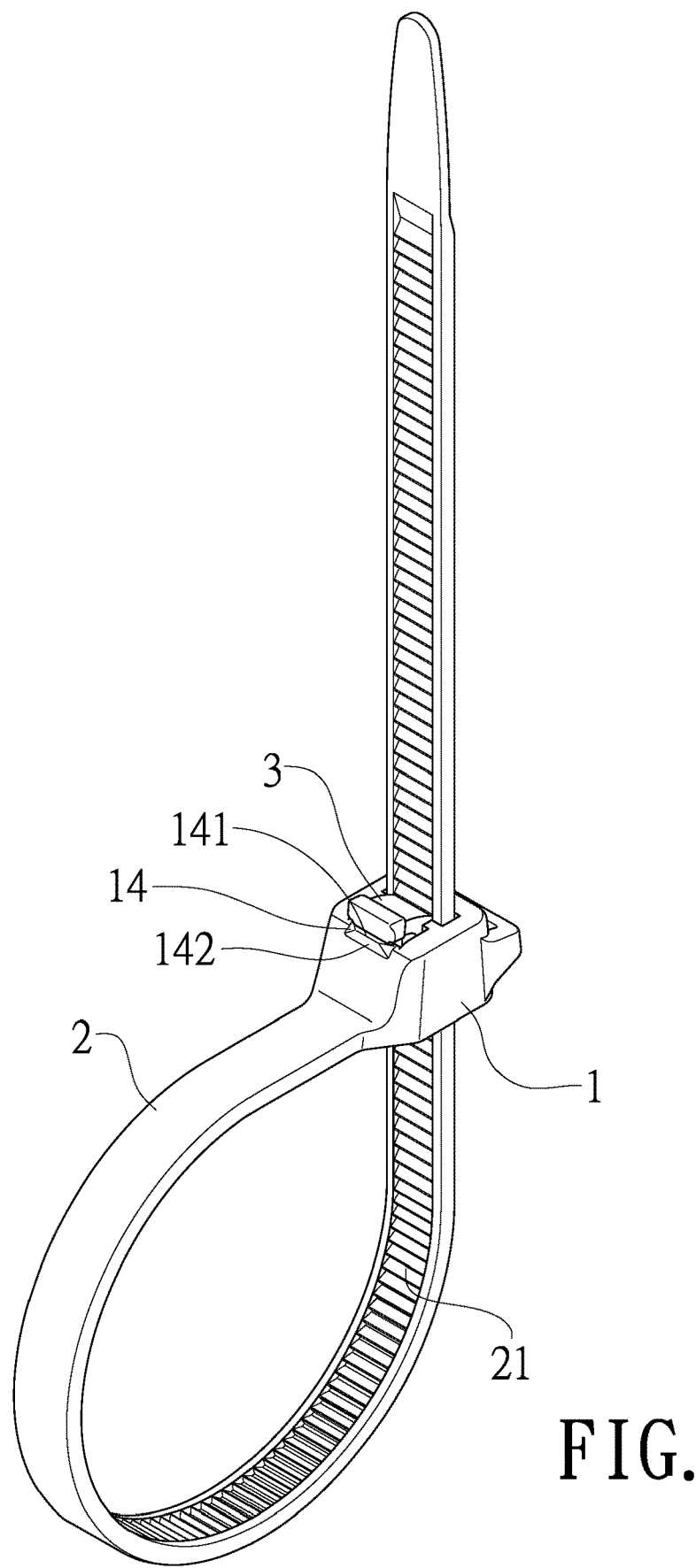
FIG. 5 is a stereogram showing a cable tie of the present invention used for bundling items.
Figure 6:
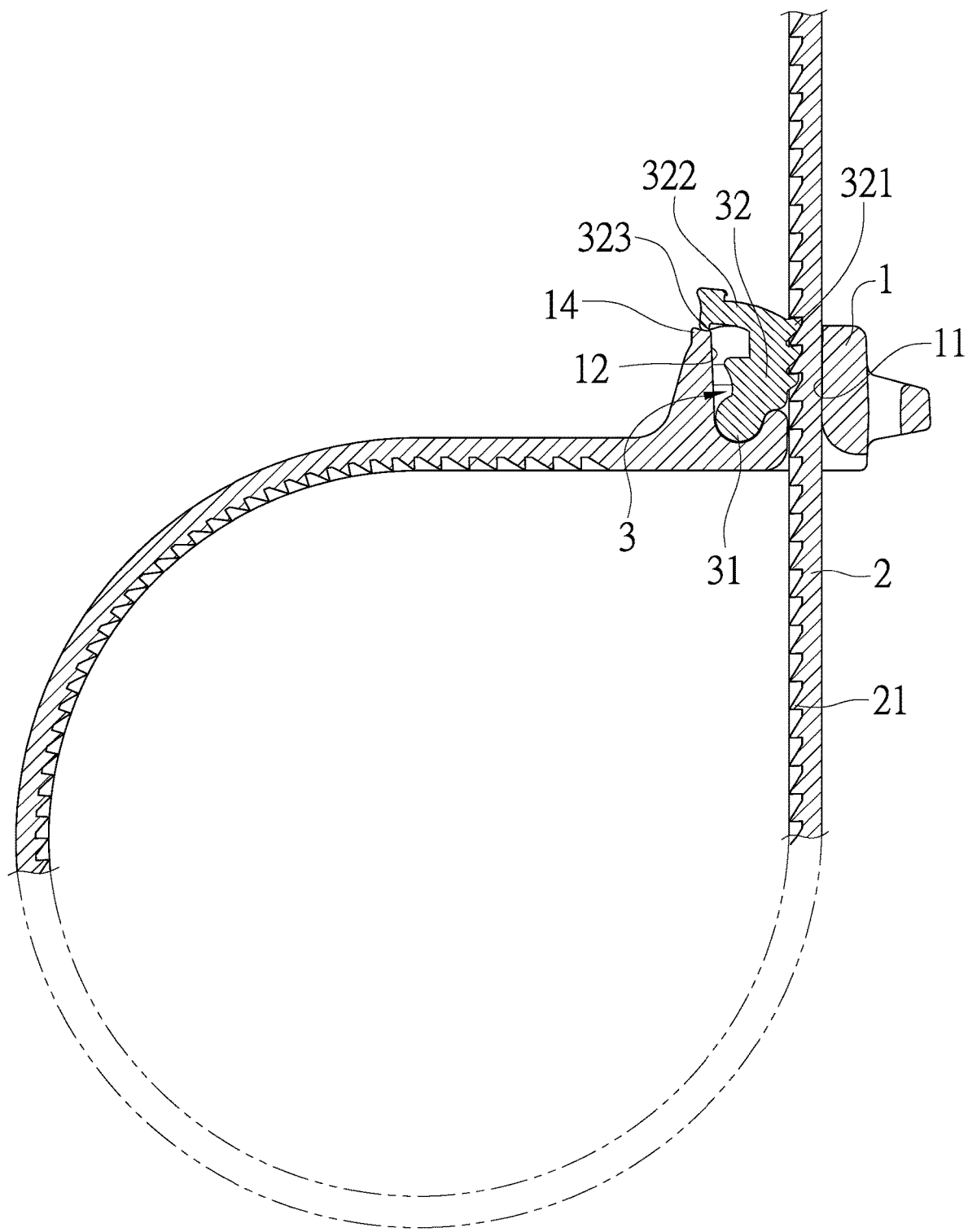
FIG. 6 is sectional diagram showing a cable tie of the present invention used for bundling items.

Accordingly, when the present invention is used to tie up objects, as shown in FIG. 5 and FIG. 6, the belt (2) of the cable tie is wrapped around the objects, and the free end of the belt (2) is then inserted to the channel (11) of the locking head (1) from a bottom side of the channel (11) and passed through the channel (11) to engage with the plural engaging claws (321) of the engaging sheet (32) of the buckle (3) by any one of the plural rack teeth (21) of the belt (2) to position the belt (2) and tie up the objects. After the plural rack teeth

(21) of the belt (2) are engaged with the engaging claws (321), the belt (2) can only move in one direction, and a pulling force can be applied to the free end of the belt (2) to pull the belt (2) and wrap the objects more tightly. In addition, to prevent interference of the excess belt (2) after the objects are tied up, the excess belt (2) is inserted into the slot (13) of the locking head (1) for folding and storing the excess belt (2) without cutting and removing the excess belt (2). Therefore, the cable tie of the present invention can be applied to tie up objects having larger size when the present invention is reused so as to increase convenience in use.

Figure 7:
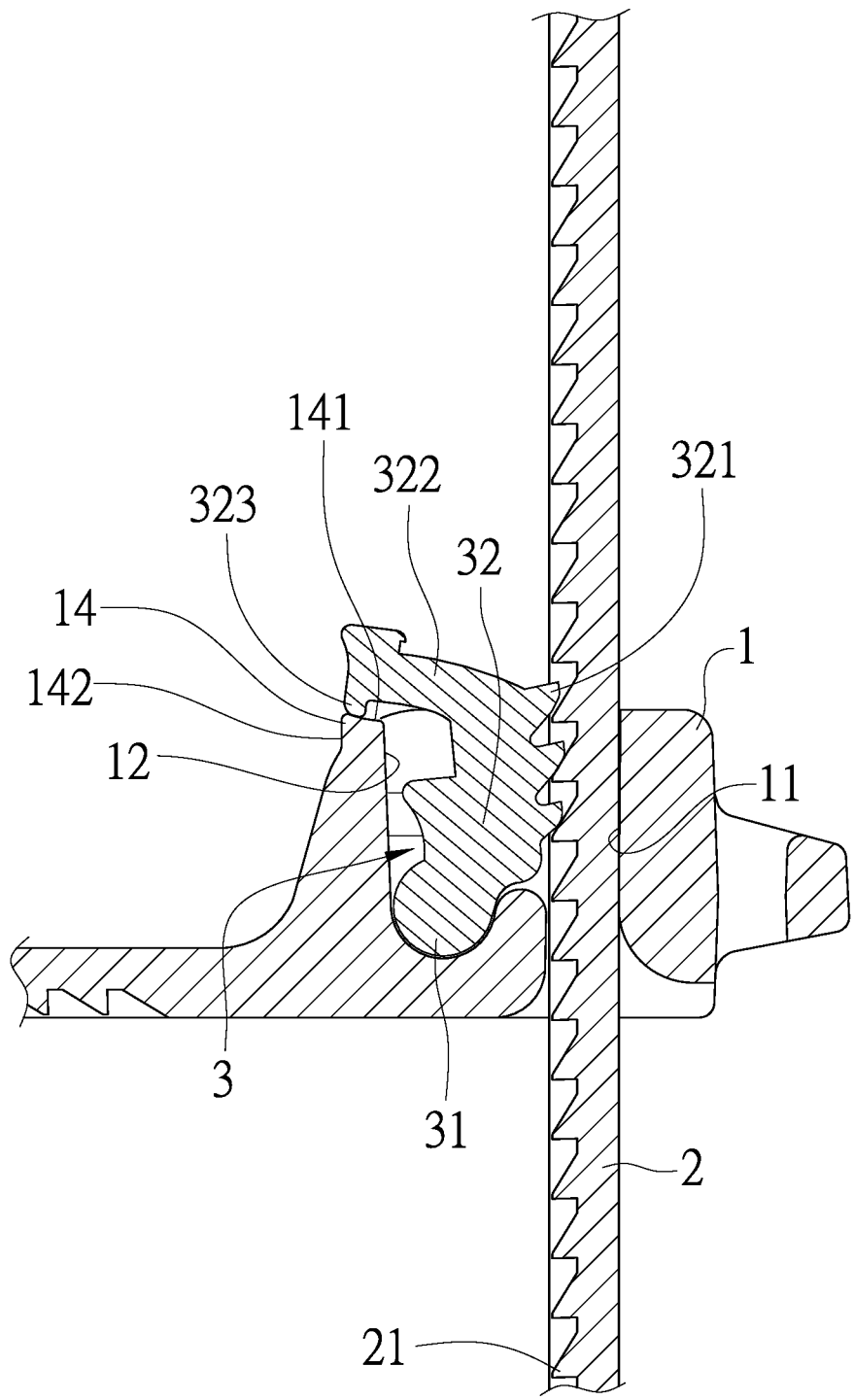
FIG. 7 is a sectional diagram showing a cable tie of the present invention in adjusting tightness.

When the belt (2) is pulled by a force to increase bundling tightness to an object as shown in FIG. 7, the plural rack teeth (21) of the belt (2) push against the engaging claws (321) of the engaging sheet (32) of the buckle (3) to push back the engaging sheet (32). At the same time, the bottom edge of the positioning protrusion (323) of the engaging sheet (32) moves back along the first inclined surface (141) of the positioning block (14) for passing the plural rack teeth (21) of the belt (2) through the engaging claws (321) of the buckle (3). After the bundle tightness of the present invention is adjusted to a tightness needed, the positioning protrusion (323) of the engaging sheet (32) moves forwardly by a guidance of the first inclined surface (141) of the positioning block (14) to revert the engaging sheet (32) to an original position for engaging the engaging claws (321) of the engaging sheet (32) with the plural rack teeth (21) of the belt (2).

Figure 8:
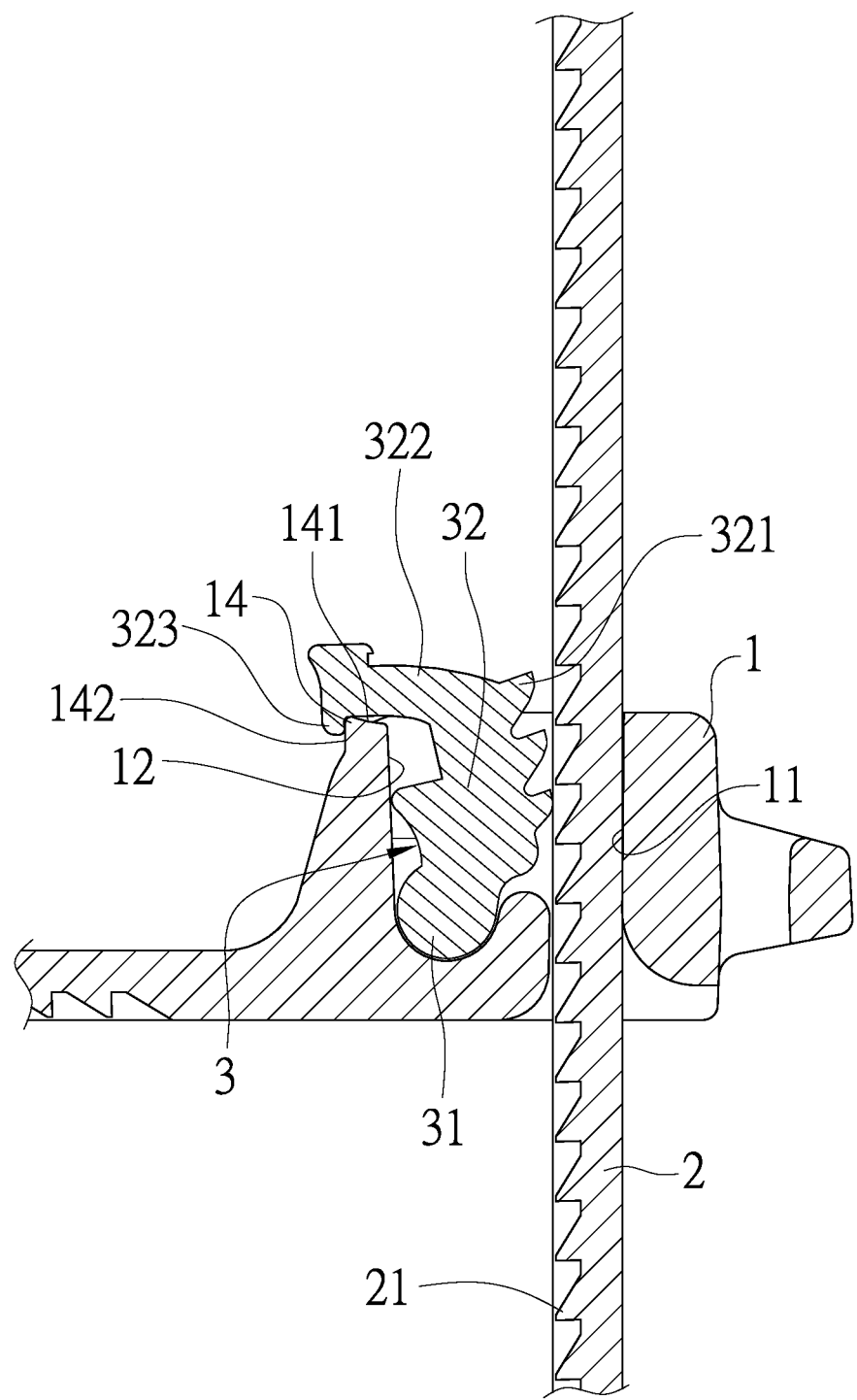
FIG. 8 is a sectional diagram showing a cable tie of the present invention in an unfastened state.

Referring to FIG. 8, to untie the objects tied by the present invention, the extension segment (322) bended back from the engaging sheet (32) of the buckle (3) is pulled back and the positioning protrusion (323) is engaged with the fastening surface (142) at a back side of the positioning block (14) to unfasten the engaging claws (321) of the engaging sheet (32) from the plural rack teeth (21) of the belt (2), and the belt (2) can be pulled out from the channel (11) of the locking head (1) to untie the objects.

Since the assembly groove (12) of the locking head (1) is provided with two guiding segments (122) tapered downward from an upper edge respectively at the two lateral walls of the assembly groove (12) and the pivot (31) of the buckle (3) has two second inclined surfaces (311) respectively at two ends thereof, the buckle (3) can be placed in the assembly groove (12) of the locking head (1) smoothly by moving the two ends of the pivot (31) along the two guiding segments (122) of the assembly groove (12) so as to increase convenience for assembling of the buckle (3) to the locking head (1).

In addition, the slot (13) of the locking head (1) provides a usage of storage the excess belt (2) after the objects are tied up and is also used for an insertion of another belt (2) for connection or used as a hanging hole for hanging objects.

According to the structure and embodiments described above, advantages of the present invention comprises:

1. The engaging sheet of the buckle of the present invention has a positioning protrusion. When the belt is pulled by a force to increase bundling tightness to an object, the plural rack teeth of the belt push against the engaging claws of the engaging sheet of the buckle to push back the engaging sheet and pass the plural rack teeth through the engaging claws. After the bundle tightness of the present invention is adjusted to a tightness needed, the positioning protrusion of the engaging sheet moves by a guidance of the first inclined surface of the positioning block to revert the engaging sheet to an original position for engaging the engaging claws of the engaging sheet with the plural rack teeth of the belt. Accordingly, the present invention is convenient to adjust.

2. The engaging sheet of the buckle of the present invention has a positioning protrusion. To unfasten the present invention, the engaging sheet is pulled back and the positioning protrusion of the engaging sheet is engaged with the fastening surface at a back side of the positioning block to maintain a separation state of the engaging claws and the plural rack teeth, and the belt can be pulled out from the channel of the locking head to untie objects tied by the present invention. Accordingly, the present invention increases convenience for engaging or unfastening the engaging sheet of the buckle with the plural rack teeth if the belt.

3. The pivot of the buckle of present invention has two second inclined surfaces at two ends thereof and is placed in and pivotally connected to the locking head by a guidance of the two guiding segments at two laterals of the assembly groove of the locking head so as to increase convenience for assembling the buckle and the locking head.

4. The locking head of the present invention has a slot at a front side for storing the excess belt after the objects are tied up, which prevents an interference of the excess belt when using. Furthermore, the slot of the locking head is also used for an insertion of a belt of another cable tie or used for hanging objects so as to increase convenience in use.

What is claimed is:

1. A cable tie, comprising:
  a locking head having a channel, an assembly groove adjacent to the channel and a positioning block formed at an upper edge of a back side thereof, wherein the assembly groove has a hollow portion communicated with the channel at a front side thereof and two pivot holes respectively at two lateral walls close to a bottom thereof, and wherein the positioning block has a first inclined surface at a back upper edge and tilted downwardly to the assembly groove and a fastening surface at a back side thereof;
  a belt connected to a back side of the locking head at one end thereof for inserting into the channel of the locking head and having plural rack teeth disposed longitudinally on one surface thereof; and
  a buckle disposed in the assembly groove of the locking head and having a pivot at a bottom thereof for respectively and pivotally connecting the two pivot holes formed on the two lateral walls of the assembly groove at two ends thereof, an engaging sheet having plural engaging claws passing through the hollow portion of the assembly groove to be located in the channel for correspondingly engaging with the plural rack teeth of the belt, wherein the engaging sheet has an extension segment bended back from an upper end thereof and a positioning protrusion at a bottom of the extension segment, and wherein the positioning protrusion is attached to and moving along the first inclined surface of the positioning block by a bottom edge thereof for engaging with or unfastening from the fastening surface at the back side of the positioning block to unfasten and fasten respectively, the engaging claws of the engaging sheet from the plural rack teeth.

2. The cable tie as claimed in claim 1, wherein the locking head is provided with a slot at a front side thereof.

3. The cable tie as claimed in claim 1, wherein the assembly groove of the locking head has a curved surface at the bottom for contacting the pivot of the buckle.

4. The cable tie as claimed in claim 1, wherein the assembly groove of the locking head is provided with two guiding segments tapered downward from an upper edge respectively at the two lateral walls thereof above the two pivot holes, and wherein the pivot of the buckle is placed in the assembly groove of the locking head and pivotally connected to the two pivot holes by two ends moving along the two guiding segments of the assembly groove.

5. The cable tie as claimed in claim 4, wherein the pivot of the buckle is provided with two second inclined surfaces tapered downward respectively at two ends thereof so as to be placed in the locking head and pivotally connected to the two pivot holes by the two second inclined surfaces moving along the two guiding segments of the assembly groove.

\* \* \* \* \*